(12) United States Patent
Udatsu et al.

(10) Patent No.: US 12,544,713 B2
(45) Date of Patent: Feb. 10, 2026

(54) CARBON DIOXIDE CAPTURING SYSTEM AND OPERATION METHOD THEREOF

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Mitsuru Udatsu, Kawasaki (JP); Yusuke Handa, Tokyo (JP); Hideo Kitamura, Tokyo (JP)

(73) Assignees: KABUSHIKI KAISHA TOSHIBA, Tokyo (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 493 days.

(21) Appl. No.: 18/159,364

(22) Filed: Jan. 25, 2023

(65) Prior Publication Data
US 2023/0166213 A1    Jun. 1, 2023

Related U.S. Application Data

(62) Division of application No. 17/113,953, filed on Dec. 7, 2020, now Pat. No. 11,583,800.

(30) Foreign Application Priority Data

Dec. 9, 2019 (JP) ................................. 2019-222352

(51) Int. Cl.
*B01D 53/62* (2006.01)
*B01D 19/00* (2006.01)
(Continued)

(52) U.S. Cl.
CPC ......... *B01D 53/62* (2013.01); *B01D 19/0015* (2013.01); *B01D 53/1475* (2013.01);
(Continued)

(58) Field of Classification Search
None
See application file for complete search history.

(56) References Cited

U.S. PATENT DOCUMENTS

| 8,652,236 B2 | 2/2014 | Find et al. |
| 9,545,595 B2 | 1/2017 | Find |

(Continued)

FOREIGN PATENT DOCUMENTS

| CN | 101605724 A | 12/2009 |
| EP | 3 097 970 A1 | 11/2016 |

(Continued)

OTHER PUBLICATIONS

Restriction Requirement on U.S. Appl. No. 17/113,953 dtd Dec. 30, 2021.

(Continued)

*Primary Examiner* — Daniel Berns
(74) *Attorney, Agent, or Firm* — Foley & Lardner LLP (57) ABSTRACT

According to embodiment, a carbon dioxide capturing system cools a regenerator discharge gas discharged from a regenerator 5 containing carbon dioxide by a cooling unit 8, and then sends the gas to a cleaner 9. The cleaner 9 receives condensed water generated from the regenerator discharge gas cooled by the cooler 9, and a gaseous cooled regenerator discharge gas, and cleans the cooled regenerator discharge gas by a cleaning liquid. The cleaner 9 has a first liquid reservoir 9b configured to store the condensed water, and a second liquid reservoir 9c configured to store the cleaning liquid having cleaned the cooled regenerator discharge gas.

1 Claim, 3 Drawing Sheets

(51) Int. Cl.
  *B01D 53/14* (2006.01)
  *B01D 53/18* (2006.01)
  *B01D 53/74* (2006.01)
  *B01D 53/78* (2006.01)
  *B01D 53/96* (2006.01)

(52) U.S. Cl.
  CPC ......... *B01D 53/1493* (2013.01); *B01D 53/18* (2013.01); *B01D 53/74* (2013.01); *B01D 53/78* (2013.01); *B01D 2252/103* (2013.01); *B01D 2257/504* (2013.01)

(56) References Cited

U.S. PATENT DOCUMENTS

| | | | |
|---|---|---|---|
| 2016/0136566 A1* | 5/2016 | Chiba | B01D 53/18 95/24 |
| 2020/0114305 A1 | 4/2020 | Miyamoto et al. | |

FOREIGN PATENT DOCUMENTS

| | | |
|---|---|---|
| JP | 2008-126154 A | 6/2008 |
| JP | 2011-529430 A | 12/2011 |
| JP | 2014-057941 A | 4/2014 |
| JP | 2018-187585 A | 11/2018 |
| JP | 2019-000795 A | 1/2019 |
| JP | 2019-130531 A | 8/2019 |
| WO | WO-2020/075538 A1 | 4/2020 |

OTHER PUBLICATIONS

US Non-Final Office Action on US Appl. U.S. Appl. No. 17/113,953 dated Jun. 29, 2022 (8 pages).
US Notice of Allowance on US Appl. U.S. Appl. No. 17/113,953 dated Oct. 24, 2022 (9 pages).
JP Notice of Allowance for JP Appl. Ser. No. 2023-172966 dated Oct. 29, 2024 (3 pages).

* cited by examiner

CARBON DIOXIDE CAPTURING SYSTEM AND OPERATION METHOD THEREOF

CROSS REFERENCE TO RELATED APPLICATION

This application is a divisional application of U.S. patent application Ser. No. 17/113,953, filed on Dec. 7, 2020, which is based upon and claims the benefit of priority from the prior Japanese Patent Application No. 2019-222352, filed on Dec. 9, 2019, the entire contents of which are incorporated herein by reference.

FIELD

Embodiments described herein relate to a carbon dioxide capturing system and an operation method thereof.

BACKGROUND

In recent years, carbon dioxide capture and storage (CCS) technology has been paid attention as an effective measure against the global warming problem. For example, it is considered to use a carbon dioxide capturing system that captures carbon dioxide with absorbing liquid from process exhaust gas (process target gas), which is generated from an exhaust gas discharge facility such as a thermal power plant, steel mill, trash burning site, and manufacturing facility.

The carbon dioxide captured by the carbon dioxide capturing system may be processed into raw materials, gases, etc., for commercial use. In this case, the purity of the captured carbon dioxide is generally desired to be high.

A carbon dioxide capturing system using an absorbing liquid absorbs carbon dioxide in a process exhaust gas in the absorbing liquid, and releases the carbon dioxide from the absorbing liquid having absorbed the carbon dioxide. At this time, the absorbing liquid generally releases a gas containing the carbon dioxide, an absorbing liquid component, etc., but the absorbing liquid component decreases the purity of the carbon dioxide. Thus, some carbon dioxide capturing systems include an apparatus for cleaning the gas to remove the absorbing liquid component.

When a gas containing carbon dioxide is cleaned by a cleaning liquid, the cleaning liquid having cleaned the gas may be circulated to be repeatedly used for the cleaning. However, in this case, there is a possibility that a concentration of an absorbing liquid component mixed in the cleaning liquid gradually increases, which results in gradual decrease in cleaning effect.

Embodiments described herebelow provide a carbon dioxide capturing system and an operation method thereof which are capable of effectively cleaning a gas, which contains carbon dioxide having been released from an absorbing liquid having absorbed the carbon dioxide, by a simple structure for a long period of time.

DETAILED DESCRIPTION

In one embodiment, a carbon dioxide capturing system comprises: an absorber configured to bring a process target gas containing carbon dioxide and an absorbing liquid into contact with each other, and to discharge the absorbing liquid having absorbed the carbon dioxide and an absorber discharge gas containing the process target gas from which the carbon dioxide has been removed; a regenerator configured to release the carbon dioxide from the absorbing liquid having been discharged from the absorber, and to discharge the absorbing liquid having released the carbon dioxide and a regenerator discharge gas containing the carbon dioxide; a cooler configured to cool the regenerator discharge gas; and a cleaner configured to receive condensed water generated from the regenerator discharge gas cooled by the cooler and a gaseous cooled regenerator discharge gas, and to clean the cooled regenerator discharge gas by a cleaning liquid. The cleaner has a first liquid reservoir configured to store the condensed water, and a second liquid reservoir configured to store the cleaning liquid having cleaned the cooled regenerator discharge gas.

In one embodiment, an operation method of a carbon dioxide capturing system is a method of operating a carbon dioxide capturing system that includes: an absorber configured to bring a process target gas containing carbon dioxide and an absorbing liquid into contact with each other, and to discharge the absorbing liquid having absorbed the carbon dioxide and an absorber discharge gas containing the process target gas from which the carbon dioxide has been removed; and a regenerator configured to release the carbon dioxide from the absorbing liquid having been discharged from the absorber, and to discharge the absorbing liquid having released the carbon dioxide and a regenerator discharge gas containing the carbon dioxide. The method comprises: a step of cooling the regenerator discharge gas to separate the regenerator discharge gas into condensed water and a gaseous cooled regenerator discharge gas; a step of storing the condensed water in a first liquid reservoir; a step of cleaning the cooled regenerator discharge gas by a cleaning liquid; and a step of storing, in a second liquid reservoir, the cleaning liquid having cleaned the cooled regenerator discharge gas.

Herebelow, respective embodiments are described in detail with reference to the attached drawings.

First Embodiment

Figure 1:
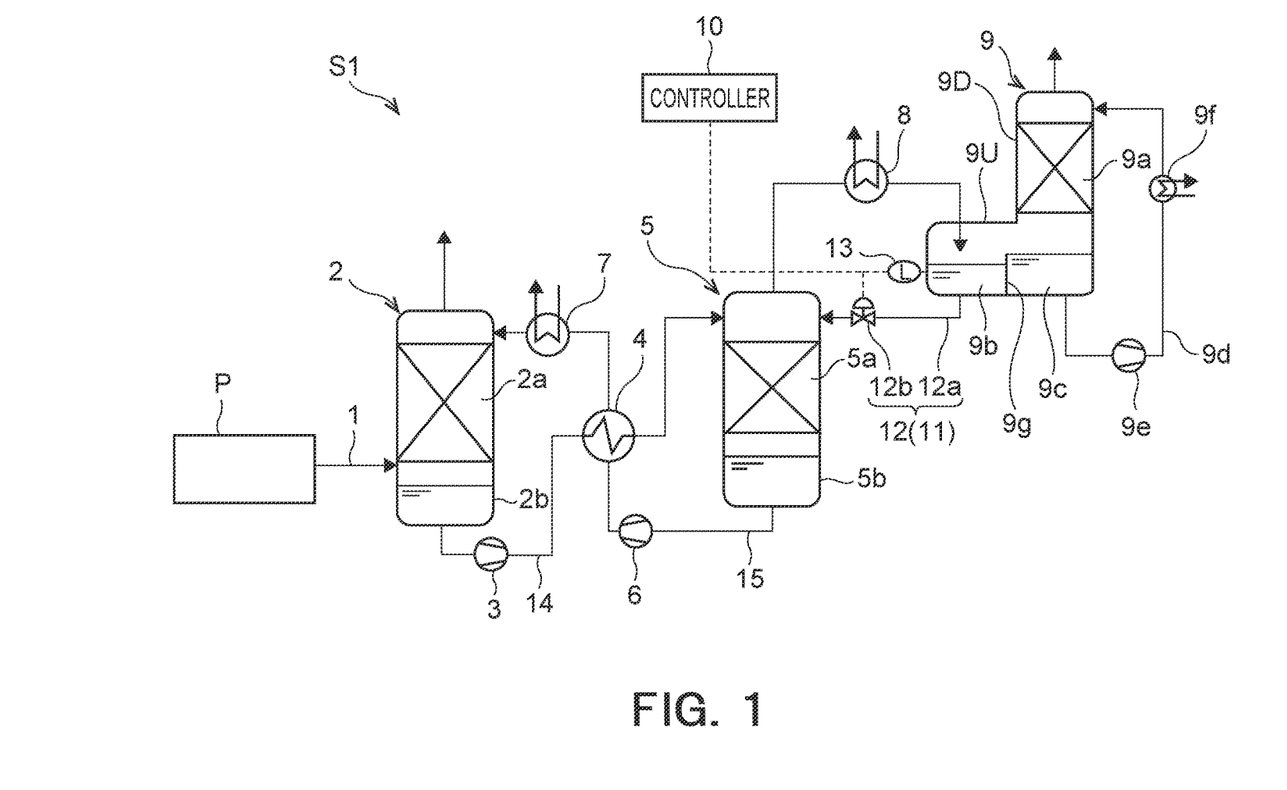
FIG. 1 is a view showing a structure of a carbon dioxide capturing system according to a first embodiment.

FIG. 1 is a view schematically showing a structure of a carbon dioxide capturing system S1 according to a first embodiment.

The carbon dioxide capturing system S1 shown in FIG. 1 includes a process exhaust gas line 1, an absorber 2, a rich liquid pump 3, a regenerative heat exchanger 4, a regenerator 5, a lean liquid pump 6, a lean liquid cooling unit 7, a gas cooling unit 8, a cleaner 9 and a controller 10.

The process exhaust gas line 1 is a flaw path that introduces a process exhaust gas discharged from an exhaust gas discharge facility P, such as combustion exhaust gas, into the absorber 2. The exhaust gas discharge facility P is, for example, a power plant such as a thermal power plant, a factory of a steel mill or a garbage processing plant, or a combustion facility such as a trash burning site or a manufacturing facility. The process exhaust gas is an example of process target gas to be processed by the carbon dioxide capturing system S1. Such a process exhaust gas may contain minor components such as sulfur oxides, nitrogen oxides and chlorine. In this case, for example, the process exhaust gas line 1 may be provided with a pretreatment facility for removing minor components, and pretreated process exhaust gas may be introduced into the absorber 2.

The absorber 2 is, for example, configured by a countercurrent gas-liquid contactor, and includes a packed bed 2a and a liquid reservoir 2b located therebelow. The absorber 2 includes a gas introduction port for introducing the process exhaust gas below the packed bed 2a, and an absorbing liquid introduction port for introducing an absorbing liquid (lean liquid) above the packed bed 2a. The absorbing liquid introduced from the absorbing liquid introduction port falls down into the packed bed 2a, and the process exhaust gas introduced from the gas introduction port moves up toward the packed bed 2a.

The absorber 2 brings the process exhaust gas into gas-liquid contact with the absorbing liquid in the packed bed 2a, and causes the absorbing liquid to absorb carbon dioxide in the process exhaust gas. As a result, the absorbing liquid (rich liquid) that has absorbed the carbon dioxide falls down from the packed bed 2a to be collected in the liquid reservoir 2b. The rich liquid is discharged to the outside through an absorbing liquid discharge port provided at the bottom of the absorber 2. On the other hand, an absorber discharge gas, which contains the process exhaust gas from which the carbon dioxide has been removed, moves up from the packed bed 2a to be discharged (released) to the outside from the top of the absorber 2. The absorber discharge gas, which has moved up from the packed bed 2a, may be cleaned by a cleaning unit provided on the top side in the absorber 2, for example, and may be then discharged to the outside.

Although the absorber 2 includes only one packed bed 2a, the absorbent 2 may include a plurality of packed beds 2a or may include one or more reaction units (for example, trays), instead. In addition, the carbon dioxide capturing system S1 may further include a cooler configured to cool the absorber discharge gas discharged from the absorber 2.

An example of the absorbing liquid is an amine-based aqueous solution containing one or more amines. Monoethanolamine and diethanolamine are exemplary amines. The absorbing liquid may contain other amines and may further contain additives or the like depending on the purpose.

The absorbing liquid discharged from the absorbing liquid discharge port provided at the bottom of the absorber 2 is transferred by the rich liquid pump 3 to the regenerator 5 via the regenerative heat exchanger 4. At this time, the absorbing liquid moving from the absorber 2 to the regenerator 5 is heated through heat exchange in the regenerative heat exchanger 4.

The regenerator 5 is, for example, configured by a countercurrent gas-liquid contactor, and includes a packed bed 5a and a liquid reservoir 5b located therebelow. The regenerator 5 includes, above the packed bed 5a, an absorbing liquid introduction port for introducing the absorbing liquid (rich liquid) discharged from the absorber 2.

The regenerator 5 heats the absorbing liquid introduced from its absorbing liquid introduction port so as to cause most of the carbon dioxide together with steam to be released from the absorbing liquid, to thereby separate the carbon dioxide from the absorbing liquid. Specifically, the regenerator 5 is equipped with a reboiler, not shown, and heats the absorbing liquid through heat exchange between high-temperature steam supplied from the reboiler and the absorbing liquid. The absorbing liquid, which was not separated by heating and passed through the packed bed 5a, falls down into the liquid reservoir 5b. As a result, the absorbing liquid (lean liquid) having released the carbon dioxide is collected in the liquid reservoir 5b and is discharged to the outside from the absorbing liquid discharge port provided at the bottom of the regenerator 5.

The absorbing liquid (lean liquid) discharged from the absorbing liquid discharge port at the bottom of the regenerator 5 is returned to the absorber 2, by the lean liquid pump 6, via the regenerative heat exchanger 4 and the lean liquid cooling unit 7. At this time, the absorbing liquid from the regenerator 5 toward the absorber 2 is cooled by heat exchange in the regenerative exchanger 4 and also cooled by the cooling operation of the lean liquid cooling unit 7. In the regenerative exchanger 4, heat exchange between the absorbing liquid from the absorber 2 toward the regenerator 5 and the absorbing liquid from the regenerator 5 toward the absorber 2 is performed.

Although the regenerator 5 includes only one packed bed 5a, the regenerator 5 may include a plurality of packed beds 5a or may include one or more reaction units (for example, trays), instead. In addition, instead of being configured as a regenerator including the packed bed 5a and the liquid reservoir 5b, the regenerator 5 may be configured to include a flash drum (flash tank) that heats absorbing liquid in a tank to release carbon dioxide together with steam. In this case, the regenerator 5 may include, for example, an electric heater, as a heater that heats the absorbing liquid.

On the other hand, the gas (regenerator discharge gas herebelow) containing the carbon dioxide, which has been released from the absorbing liquid in the regenerator 5, and the steam, is discharged to the outside from a gas discharge port provided at the top of the regenerator 5, and is sent to the gas cooling unit 8 via a pipe member so as to be cooled by the gas cooling unit 8.

The gas cooling unit 8 cools the regenerator discharge gas to condense a part of the regenerator discharge gas, to thereby separate the regenerator discharge gas into condensed water and a gaseous cooled regenerator discharge gas. The condensed water contains an absorbing liquid component, while the cooled regenerator discharge gas mainly contains the carbon dioxide. The condensed water and the cooled regenerator discharge gas are transferred to the cleaner 9.

The cleaner 9 receives the condensed water and the cooled regenerator discharge gas flowing out from the gas cooling unit 8, cleans the cooled regenerator discharge gas by a cleaning liquid to remove impurities contained in the cooled regenerator discharge gas, such as the absorbing liquid component, and discharges the cleaned cooled regenerator discharge gas. Examples of impurities are a main component of the absorbing liquid (for example, amine), an additive component of the absorbing liquid, a secondary component generated by the deterioration of the absorbing liquid, etc. The cleaning liquid is not particularly limited, but may be, for example, water. The cooled regenerator discharge gas from which impurities have been removed by cleaning becomes highly pure carbon dioxide, and is discharged from the cleaner 9. The carbon dioxide discharged from the cleaner 9 may be converted by a compression pump to a state suitable for a purpose, such as a supercritical state or a liquid state, for example, and may be stored or transported by a tank, a lorry, a pipeline and so on.

The cleaner 9 includes a packed bed 9a, a first liquid reservoir 9b and a second liquid reservoir 9c located below the packed bed 9a, a circulation line 9d, a cleaning-liquid pump 9e and cleaning-liquid cooling unit 9f. The cleaner 9 has a gas-liquid introduction port for introducing the condensed water and the cooled regenerator discharge gas below the packed bed 9a, and a cleaning-liquid introduction port for introducing the cleaning liquid above the packed bed 9*a*. In more detail, in a direction along which the cooled regenerator discharge gas flows, the second liquid reservoir 9*c* is located on the downstream side of the first liquid reservoir 9*b*, and the gas-liquid introduction port is provided below the packed bed 9*a*, above the first liquid reservoir 9*b* and on the upstream side of the second liquid reservoir 9*c*.

In detail, the cleaner 9 receives the condensed water and the cooled regenerator discharge gas from the gas cooling unit 8. The cleaner 9 first stores the condensed water in the first liquid reservoir 9*b*, and then causes the cooled regenerator discharge gas to pass above the first liquid reservoir 9*b* and the second liquid reservoir 9*c* to flow into the packed bed 9*a*. Then, the cleaner 9 is configured to clean the cooled regenerator discharge gas by the cleaning liquid in the packed bed 9*a*, and to store, in the second liquid reservoir 9*c*, the cleaning liquid having cleaned the cooled regenerator discharge gas.

As described above, since the gas-liquid introduction port is provided below the packed bed 9*a*, above the first liquid reservoir 9*b* and on the upstream side of the second liquid reservoir 9*c*, the condensed water flowing from the gas-liquid introduction port into the cleaner 9 is stored in the first liquid reservoir 9*b*, and is prevented from flowing into the second liquid reservoir 9*c* side. Meanwhile, the cooled regenerator discharge gas separates from the condensed water and passes above first liquid reservoir 9*b* and the second liquid reservoir 9*c* to flow into the packed bed 9*a*.

In this embodiment, the first liquid reservoir 9*b* and the second liquid reservoir 9*c* are partitioned by a weir 9*g*. The cleaner 9 has an upstream casing 9U having the first liquid reservoir 9*b* and the second liquid reservoir 9*c*, and a downstream casing 9D projecting upward from a part of an upper part of the upstream casing 9U, which is vertically opposed to the second liquid reservoir 9*c*. The weir 9*g* stands from the bottom of the upstream casing 9U. The downstream casing 9D accommodates the packed bed 9*a*.

As described above, the cooled regenerator discharge gas separates from the condensed water and passes above first liquid reservoir 9*b* and the second liquid reservoir 9*c* to flow into the packed bed 9*a*. Here, the cleaning liquid is introduced from the cleaning-liquid introduction port above the packed bed 9*a*. The cleaning liquid falls down in the packed bed 9*a* so as to be brought into gas-liquid contact with the cooled regenerator discharge gas. Thus, the packed bed 9*a* removes the absorbing-liquid component remaining in the cooled regenerator. At this time, the cooled regenerator discharge gas is further cooled by the cleaning liquid in the packed bed 9*a*, so that condensed water mainly containing the absorbing liquid component is generated from the cooled regenerator discharge gas. The condensed water falls down together with the cleaning liquid from the packed bed 9*a*, so that the absorbing liquid component is removed. Since the second liquid reservoir 9*c* is located below the packed bed 9*a*, the cleaning liquid having cleaned the cooled regenerator discharge gas is stored in the second liquid reservoir 9*c*.

Particularly in this embodiment, the packed bed 9*a* and the second liquid reservoir 9*c* vertically overlap, while the packed bed 9*a* and the first liquid reservoir 9*b* do not vertically overlap. Thus, the cleaning liquid falling down from the packed bed 9*a* is prevented from falling down into the first liquid reservoir 9*b*.

The cleaning liquid stored in the second liquid reservoir 9*c* is discharged to the outside from a cleaning liquid discharge port provided at the bottom of the second liquid reservoir 9*c*, and is introduced again to the cleaner 9 through the circulation line 9*d* from the cleaning liquid introduction port above the packed bed 9*a*. Namely, the cleaning liquid circulates in a circulation path composed of the cleaning liquid introduction port, the packed bed 9*a*, the second liquid reservoir 9*c* and the circulation line 9*d*. The cleaning-liquid pump 9*e* and the cleaning liquid cooling unit 9*f* are provided on the circulation line 9*d*. The cleaning-liquid pump 9*e* generates power for sending the cleaning liquid from the cleaning liquid discharge port to the cleaning liquid introduction port. The cleaning liquid cooling unit 9*f* cools the cleaning liquid before it flows out from the cleaning liquid introduction port. On the other hand, the cooled regenerator discharge gas from which the absorbing liquid component has been removed by the cleaning liquid in the packed bed 9*a* becomes highly pure carbon dioxide, as described above, and is discharged from a discharge port provided at the top of the cleaner 9 so as to be captured.

In addition, the cleaner 9 in this embodiment comprises a one-way mechanism 11 that allows the cleaning liquid to flow from the second liquid reservoir 9*c* into the first liquid reservoir 9*b*, while limits flowing of the condensed water from the first liquid reservoir 9*b* into the second liquid reservoir 9*c*. The one-way mechanism 11 is constituted by a discharge structure 12 configured to discharge the condensed water stored in the first liquid reservoir 9*b* to the outside of the first liquid reservoir 9*b*, when a liquid level of the condensed water stored in the first liquid reservoir 9*b*, which is detected by a condensed-water level gauge 13, reaches a predetermined value or more. The predetermined value (liquid level) is set lower than the height of the weir 9*g*.

The discharge structure 12 includes a discharge pipe 12*a* extending from a discharge port provided at the bottom of the first liquid reservoir 9*b*, and a discharge valve 12*b* provided on the discharge pipe 12*a*. The discharge valve 12*b* switches from a closed state to an open state when the liquid level of the condensed water stored in the first liquid reservoir 9*b* reaches a predetermined level or more, so that the condensed water is discharged through the discharge pipe 12*a*. The switching operation of the discharge valve 12*b* is controlled by the controller 10. The discharge valve 12*b* may be either an on-off value, or a flowrate control valve whose opening degree can be adjusted.

The discharge pipe 12 connects the discharge port provided at the bottom of the first liquid reservoir 9*b* and the introduction port provided above the packed bed 5*a* in the regenerator 5. In this embodiment, the condensed water is discharged to the regenerator 5, but the present disclosure is not limited thereto. It is preferable that the condensed water is discharged to at least any of the absorber 2, the regenerator 5, a first process flow path 14 and a second process flow path 15 through which the absorbing liquid flows between the absorber 2 and the regenerator 5. However, the condensed water may be discharged to the outside of the carbon dioxide capturing system S1. The first process flow path 14 is a flow path that sends the absorbing liquid from the absorber 2 to the regenerator 5, and the second process flow path 15 is a flow path that sends the absorbing liquid from the regenerator to the absorber 2.

The controller 10 controls various operations of the carbon dioxide capturing system S1 including the switching operation of the discharge valve 12*b*. Examples of the controller 10 are a processer, an electric circuit, a computer, etc. The controller 10 controls, for example, the rotation speeds of the rich liquid pump 3, the lean liquid pump 6 and the cleaning-liquid pump 9*e*, the cooling operations of the lean liquid cooling unit 7 and the gas cooling unit 8, the heating operation of the reboiler, etc. Further, the controller 10 performs calculations required for these controls, and captures measured values required for such calculations.

Next, an operation of the carbon dioxide capturing system S1 according to the present invention is described.

In the carbon dioxide capturing system S1, an absorbing liquid containing carbon dioxide, which has been sent from the absorber 2 to the regenerator 5, is heated in the regenerator 5, so that a regenerator discharge gas containing the carbon dioxide and steam is released from the absorbing liquid. The regenerator discharge gas is discharged to the outside from the gas discharge port provided at the top of the regenerator 5, and is then cooled by the gas cooling unit 8.

The gas cooling unit 8 cools the regenerator discharge gas to condense a part of the regenerator discharge gas, whereby the regenerator discharge gas is separated into condensed water and a gaseous cooled regenerator discharge gas. The condensed water and the cooled regenerator discharge gas are transferred to the cleaner 9.

The cleaner 9 receives the condensed water and the cooled regenerator discharge gas, and first stores the condensed water in the first liquid reservoir 9b, while preventing the condensed water from flowing into the second liquid reservoir 9c side. On the other hand, the cooled regenerator discharge gas passes above the first liquid reservoir 9b and the second liquid reservoir 9c toward the packed bed 9a. When a liquid level of the condensed water stored in the first liquid reservoir 9b reaches a predetermined value or more, the condensed water is discharged to the outside. Thus, flowing of the condensed water from the first liquid reservoir 9b to the second liquid reservoir 9c can be reliably prevented.

Then, the cooled regenerator discharge gas, which have passed above the first liquid reservoir 9b and the second liquid reservoir 9c, flows upward from below the packed bed 9. In the packed bed 9a, the cooled regenerator discharge gas is brought into gas-liquid contact with a cleaning liquid, whereby an absorbing liquid component or the like remaining in the cooled regenerator discharge gas is removed. The cooled regenerator discharge gas from which the absorbing liquid component, etc. has been removed, becomes highly pure carbon dioxide, and is discharged from the discharge port provided at the top of the cleaner 9. On the other hand, the cleaning liquid having cleaned the cooled regenerator discharge gas falls down from the packed bed 9a so as to be stored in the second liquid reservoir 9c.

In this embodiment, before the regenerator discharge gas flows into the cleaner 9, the gas cooling unit 8 separates the regenerator discharge gas into the condensed water and the gaseous cooled regenerator discharge gas. When the cleaner 9 receives the condensed water from the gas cooling unit 8, the condensed water is stored in the first liquid reservoir 9b which is different from the second liquid reservoir 9c. Thus, the condensed water is prevented from mixing with the cleaning liquid in the second liquid reservoir 9c. As a result, even when the cleaning liquid stored in the second liquid reservoir 9c is circulated so as to reuse it in cleaning of the cooled regenerator discharge gas, progress of contamination of the cleaning liquid due to the mixing of the condensed water can be prevented. Accordingly, the cooled regenerator discharge gas can be suitably cleaned by the cleaning liquid that is not or less contaminated. This makes it possible to maintain a suitable cleaning effect by the cleaning liquid for a long period of time.

In more detail, after the condensed water containing the absorbing liquid at a high concentration has passed the gas cooling unit 8, the condensed water is firstly separated from the regenerator discharge gas, so that the cooled regenerator discharge gas contains a large amount of carbon dioxide and the reduced absorbing liquid component. Since such a cooled regenerator discharge gas is cleaned by the cleaning liquid that is mixed with no or little condensed water, suitable cleaning by the cleaning liquid can be performed. In addition, the suitable cleaning effect by such a cleaning liquid can be maintained for a long period of time.

Since the cooled regenerator discharge gas is cooled to condense the absorbing liquid component, the cleaning liquid stored in the second liquid reservoir 9c contains the condensed water. Thus, a liquid level of the cleaning liquid stored in the second liquid reservoir 9c increases as the increase in the condensed water. When the liquid level reaches the top of the weir 9g, the cleaning liquid flows into the first liquid reservoir 9b. Thus, excessive storage of the cleaning liquid in the second liquid reservoir 9c can be avoided. Although the cleaning liquid stored in the second liquid reservoir 9c may contain the condensed water, the other condensed water, which contains the absorbing absorbing component at a high concentration immediately after having passed through the gas cooling unit 8, is not mixed therewith. Thus, as compared with a structure which uses none of the gas cooling unit 8, the first liquid reservoir 9b and the second liquid reservoir 9c, progress of contamination of the cleaning liquid, which might be caused by the mixing of the condensed water, can be significantly suppressed.

In addition, the present embodiment can improve the cleaning effect by a simple structure that provides the cleaner 9 with a plurality of liquid reservoirs, and thus can improve the performance of the carbon dioxide capturing system S1 with low manufacturing cost and high manufacturing efficiency.

Thus, the present embodiment can effectively clean, with a simple structure, a gas containing carbon dioxide (regenerator discharge gas), which is released from an absorbing liquid having absorbed carbon dioxide, for a long period of time. In addition, the present embodiment can improve the cleaning effect by a simple structure that merely separates the bottom of the cleaner 9 by the weir 9g, and thus is significantly advantageous in terms of production cost and production efficiency.

Second Embodiment

Next, a carbon dioxide capturing system S2 according to a second embodiment is described with reference to FIG. 2. Constituent elements of this embodiment that are identical as those of the first embodiment are designated by the same reference numerals, and description thereof is omitted.

Figure 2:
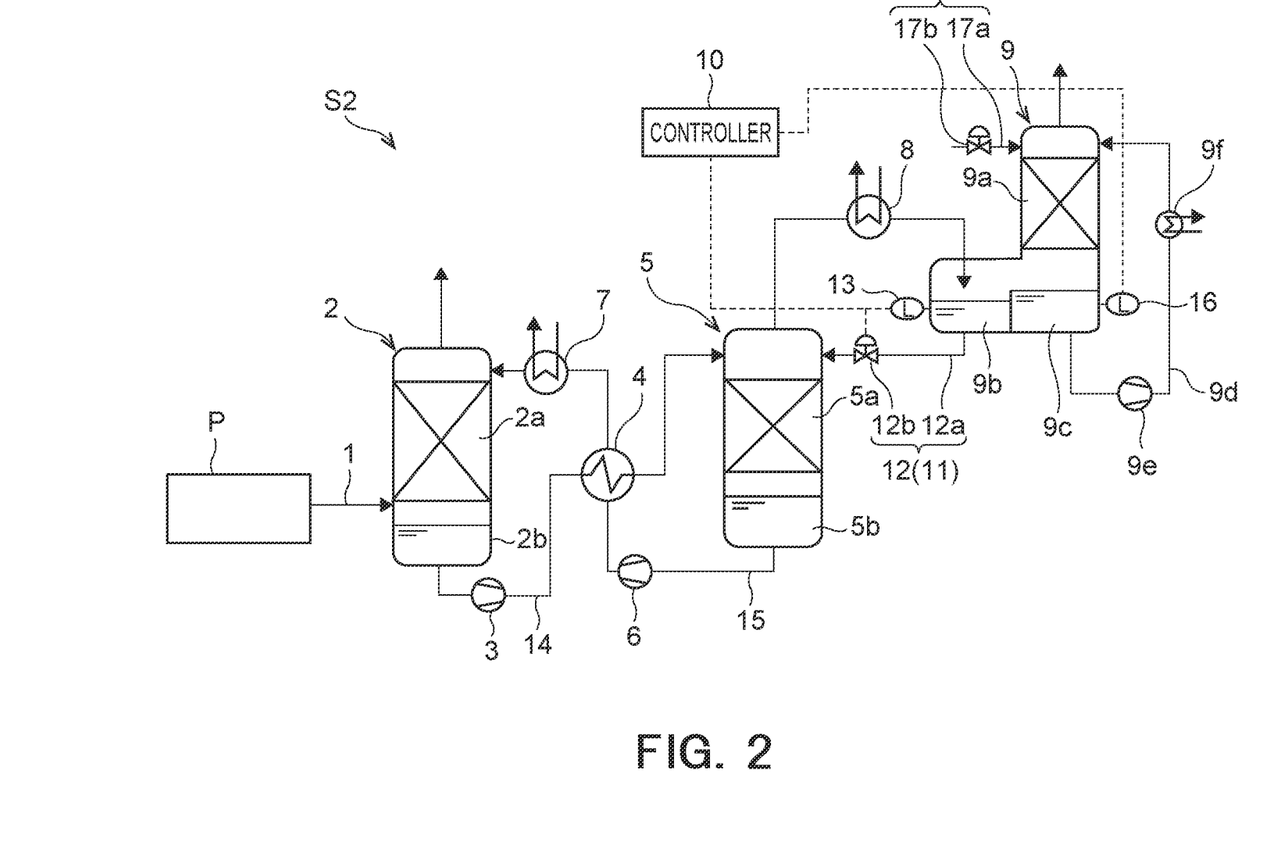
FIG. 2 is a view showing a structure of a carbon dioxide capturing system according to a second embodiment.

The carbon dioxide capturing system S2 shown in the FIG. 2 includes a cleaning-liquid level gauge 16 that detects a liquid level of the cleaning liquid stored in the second liquid reservoir 9c, and a replenishment structure 17 that replenishes the cleaning liquid with makeup water. The other elements of the second embodiment are the same as those of the first embodiment.

The replenishment structure 17 is configured to replenish a cleaning-liquid circulation path with makeup water, when a liquid level of the cleaning liquid stored in the second liquid reservoir 9c, which is detected by the cleaning-liquid level gauge 16, reaches a predetermined value or less. The cleaning-liquid circulation path is a path in which the cleaning liquid circulates through the cleaning liquid introduction port in the upper part of the cleaner 9, the packed bed 9a, the second liquid reservoir 9c, and the circulation line 9d in this order.

The replenishment structure 17 includes a makeup-water flow path 17a, and a makeup water valve 17b provided on the makeup-water flow path 17a. The makeup water valve 17b switches from a closed state to an open state when the liquid level of the cleaning liquid stored in the second liquid reservoir 9c reaches the predetermined value or less, so that makeup water is replenished to the cleaning liquid through the makeup-water flow path 17a. The switching operation of the makeup water valve 17b is controlled by the controller 10. The makeup water valve 17b may be either an on-off value, or a flowrate control valve whose opening degree can be adjusted.

In this embodiment, although the makeup-water flow path 17a is connected to the cleaner 9 above the packed bed 9a, the makeup water may be replenished to the second liquid reservoir 9c or the circulation line 9d, as long as the makeup water is supplied to the cleaning liquid.

In the aforementioned second embodiment, when the liquid level of the cleaning liquid stored in the second liquid reservoir 9c reaches a predetermined value or less, makeup water is replenished to the cleaning liquid from the replenishment structure 17. This first enables the cleaning-liquid pump 9e to be protected. Namely, a temperature of the cleaning liquid supplied from the upper part of the cleaner 9 may become higher than a temperature of the cooled regenerator discharge gas moving upward from below the packed bed 9a, because of absence of the the cleaning liquid cooing unit 9f or trouble thereof, because of a system structure that selects arbitrarily a cleaning liquid temperature condition, or because of an external factor such as a temperature, weather, etc. In this case, the cleaning liquid may evaporate in the packed bed 9a so as to be discharged from the cleaner 9 together with carbon dioxide. Thus, there is a possibility that the liquid level of the cleaning liquid in the second liquid reservoir 9c lowers. When the liquid level of the cleaning liquid in the second reservoir 9c lowers, cavitation may occur in the cleaning-liquid pump 9e to damage the cleaning-liquid pump 9e. On the other hand, in this embodiment, when the liquid level of the cleaning liquid stored in the second reservoir 9c reaches a predetermined value or less, makeup water is replenished to the cleaning liquid from the replenishment structure 17. Thus, the normal operation of the cleaning-liquid pump 9e can be maintained, which leads to protection of the cleaning-liquid pump 9e.

In addition, this embodiment allows a concentration of the absorbing liquid component in the cleaning liquid to be lowered by the replenishment of makeup water, which results in improvement in the cleaning effect of the cleaning liquid having a reduced cleaning effect.

When a large amount of makeup water is replenished to the cleaning liquid from the replenishment structure 17, the makeup water can be allowed to flow from the second liquid reservoir 9c to the first liquid reservoir 9b via the weir 9g. Thus, the makeup water can be supplied from the first liquid reservoir 9b to the absorbing liquid through the discharge structure 12. By supplying the makeup water to the absorbing liquid, a concentration of the absorbing liquid component in the absorbing liquid can be adjusted to be low by the makeup water, to thereby improve the cleaning effect on carbon dioxide. Namely, when the concentration of the absorbing liquid component in the absorbing liquid becomes excessively high, the absorbing liquid component in the regenerator discharge gas, which is discharged from the regenerator, may increases. Thus, in the subsequent cleaning by the cleaning liquid, contamination of the cleaning liquid may progress. Thus, to adjust the concentration of the absorbing liquid component in the absorbing liquid to be low results in improvement in the cleaning effect on carbon dioxide.

The cleaning liquid cooling unit 9f is provided in this embodiment. However, in the case that the liquid level in the second liquid reservoir is maintained constant by the makeup water, even if the cleaning liquid is not cooled, the cooled regenerator discharge gas can be suitably cooled by the cleaning liquid, and the cleaning-liquid pump 9e can be suitably operated. Thus, the cleaning liquid cooling unit 9f may be omitted or downsized to further reduce the cost.

Third Embodiment

Next, a carbon dioxide capturing system S3 according to a third embodiment is described with reference to FIG. 3. Constituent elements of this embodiment that are identical as those of the second embodiment are designated by the same reference numerals, and description thereof is omitted.

Figure 3:
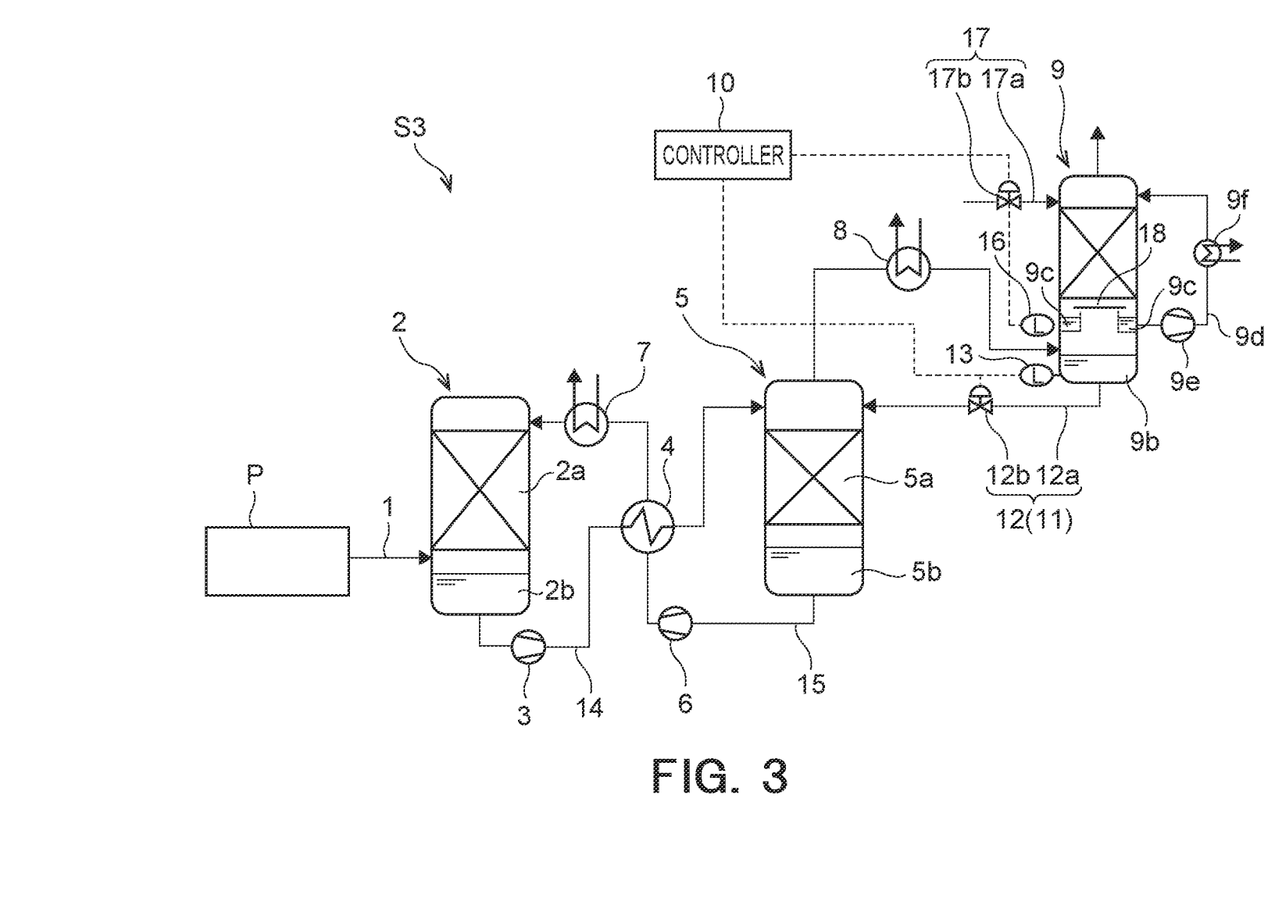
FIG. 3 is a view showing a structure of a carbon dioxide capturing system according to a third embodiment.

In the carbon dioxide capturing system S3 shown in FIG. 3, a shape of the cleaner 9 differs from that of second embodiment. In addition, a layout of the first liquid reservoir 9b and the second liquid reservoir 9c in the cleaner 9 differs from that of the first and second embodiments. To be specific, the second liquid reservoir 9c is located above the first liquid reservoir 9b. In addition, the cleaner 9 includes a guide plate 18 which constitutes a cleaning liquid capturing device together with the second liquid reservoir 9c. Other elements of the third embodiment are the same as those of the second embodiment.

The cleaner 9 has, for example, a cylindrical shape, and the second liquid reservoir 9c has, for example, a loop-like shape disposed along an inner circumferential surface of the cleaner 9. The regenerator discharge gas, which has flown from the regenerator 5 into the gas cooling unit 8, is cooled by the gas cooling unit 8 so as to be separated into the condensed water and the gaseous cooled regenerator discharge gas. Then, the condensed water and the cooled regenerator discharge gas flow into the cleaner 9 from above the first liquid reservoir 9b and below the second liquid reservoir 9c. At this time, the condensed water first flows into the first liquid reservoir 9b so as to be stored therein.

On the other hand, the cooled regenerator discharge gas passes a hollow part of the second liquid reservoir 9c through above the first liquid reservoir 9b. Since the second liquid reservoir 9c is located above the first liquid reservoir 9b, there is basically no possibility that the condensed water stored in the first liquid reservoir 9b flows into the second liquid reservoir 9c. When a liquid level of the condensed water stored in the first liquid reservoir 9b reaches a predetermined value or more, the condensed water is supplied to the absorbing liquid by the discharge structure 12.

The guide plate 18 is located such that it vertically overlaps with the hollow part of the second liquid reservoir 9c and defines a vertical gap between it and the second liquid reservoir 9c. The cooled regenerator discharge gas moves up from the gap toward the packed bed 9a to flow thereinto. Then, the cooled regenerator discharge gas is cleaned by the cleaning liquid, and then the cleaning liquid falls down onto the guide plate 18 and is stored in the second liquid reservoir 9c from the guide plate 18. The guide plate 18 is positioned to cover the hollow part of the second liquid reservoir 9c, so that the cleaning liquid is prevented from being stored in the first liquid reservoir 9b. The cleaning liquid stored in the second liquid reservoir 9c is again supplied to the upper part of the packed bed 9a through the circulation line 9d.

A liquid level of the cleaning liquid stored in the second liquid reservoir 9c is detected by the cleaning-liquid level gauge 16. When the liquid level of the cleaning liquid stored in the second liquid reservoir 9c reaches a predetermined value or less, the replenishment structure 17 replenishes the cleaning water with makeup water. In addition, when the cleaning liquid stored in the second liquid reservoir 9c overflows from second liquid reservoir 9c depending on an operating condition, the cleaning liquid flows into the first liquid reservoir 9b.

The aforementioned third embodiment can simplify the shape of the cleaner 9 and downsize the system as a whole.

While certain embodiments have been described, these embodiments have been presented by way of example only, and are not intended to limit the scope of the inventions. Indeed, the novel systems and methods described herein may be embodied in a variety of other forms; furthermore, various omissions, substitutions and changes in the form of the systems and methods described herein may be made without departing from the spirit of the inventions. The accompanying claims and their equivalents are intended to cover such forms or modifications as would fall within the scope and spirit of the inventions.

What is claimed is:

1. An operation method of a carbon dioxide capturing system that includes: an absorber configured to bring a process target gas containing carbon dioxide and an absorbing liquid into contact with each other, and to discharge the absorbing liquid having absorbed the carbon dioxide and an absorber discharge gas containing the process target gas from which the carbon dioxide has been removed; and a regenerator configured to release the carbon dioxide from the absorbing liquid having been discharged from the absorber, and to discharge the absorbing liquid having released the carbon dioxide and a regenerator discharge gas containing the carbon dioxide and steam;

the operation method comprising:

a step of cooling the regenerator discharge gas to separate the regenerator discharge gas into condensed water and a gaseous cooled regenerator discharge gas;

a step of storing the condensed water in a first liquid reservoir;

a step of cleaning the cooled regenerator discharge gas by a cleaning liquid in a cleaner; and a step of storing, in a second liquid reservoir, the cleaning liquid having cleaned the cooled regenerator discharge gas, wherein the cleaner has the first liquid reservoir and the second liquid reservoir.

* * * * *